United States Patent
DeMaise

(10) Patent No.: US 10,189,438 B2
(45) Date of Patent: Jan. 29, 2019

(54) SEAT BELT ATTACHMENT

(71) Applicant: Donald DeMaise, Delran, NJ (US)

(72) Inventor: Donald DeMaise, Delran, NJ (US)

( * ) Notice: Subject to any disclaimer, the term of this patent is extended or adjusted under 35 U.S.C. 154(b) by 50 days.

(21) Appl. No.: 15/591,249

(22) Filed: May 10, 2017

(65) Prior Publication Data

US 2018/0326941 A1 Nov. 15, 2018

(51) Int. Cl.
*B60R 22/30* (2006.01)
*A44B 11/25* (2006.01)
*B60R 22/00* (2006.01)

(52) U.S. Cl.
CPC .......... *B60R 22/30* (2013.01); *A44B 11/2557* (2013.01); *A44B 11/2561* (2013.01); *B60R 2022/008* (2013.01)

(58) Field of Classification Search
CPC . A44B 11/2557; A44B 11/2561; B60R 22/30; B60R 2022/008
See application file for complete search history.

(56) References Cited

U.S. PATENT DOCUMENTS 7,533,901 B2 * 5/2009 David ................... B60R 22/024
                                                   280/801.1
7,922,205 B2 * 4/2011 David ................... B60R 22/024
                                                   280/801.1

* cited by examiner

*Primary Examiner* — Robert Sandy
(74) *Attorney, Agent, or Firm* — Stuart M. Goldstein

(57) ABSTRACT

A seat belt attachment device is an integral body having a buckle component which has a tongue fastening mechanism configured to connect with the seat belt tongue of an existing seat belt system. An attachment tongue extends from the buckle component and is designed to connect with the seat belt connector of the existing seat belt system. At least one rigid bar extends outwardly from the buckle component such that when the seat belt buckle connector and the seat belt tongue are connected to the tongue fastening mechanism and the attachment tongue, the attachment device is located between the seat belt buckle connector and the seat belt tongue and the seat belt strap can be custom wrapped around the rigid bar in order to configure the strap comfortably away from and around the body of the occupant.

6 Claims, 3 Drawing Sheets

SEAT BELT ATTACHMENT

FIELD OF THE INVENTION

The present invention relates to a seat belt attachment device for adjusting the seat belt strap of a vehicle seat belt system in order to comfortably accommodate pregnant and overweight vehicle occupants.

BACKGROUND OF THE INVENTION

Today's automobiles all require a seat belt system which utilizes a seat belt or strap comprising a lap strap section configured to extend across the waist of the seated occupant and a shoulder strap section designed to extend across one shoulder and down the occupant's upper body. This system is designed to limit forward movement, especially in the event of a collision.

The configuration of the seat belt strap, in its secured position, causes both the lap strap section and the shoulder strap section to automatically press against the body of the occupant. This often presents a problem for a pregnant individual, in that the strap will ride up on and cross over the lower portion of the womb area. This is not only uncomfortable, but it also creates an extremely dangerous condition in that a sudden jerk caused by a collision or even the sudden stopping of the vehicle will result in the seat belt strap squeezing or tightening about the womb. This could result in injury to the fetus as well as the mother. The constant strain of the seat belt strap across the womb, even in normal use, also causes discomfort to the occupant.

While the pregnancy risk is obviously not present for men and women who are not pregnant, overweight individuals using the seat belt system also experience discomfort as a result of the seat belt strap being pressed across the individual's body.

These inherent problems with the commonly used seat belt strap often results in the individual's decision not to wear a seat belt, thus creating a truly dangerous situation.

Prior attempts to modify seat belt systems to accommodate the pregnant and overweight occupant have consisted of reconfigured seat belt assemblies which are designed to replace the entire, existing seat belt systems now used in automobiles. These assemblies are complex, usually consisting of a number of different components. They also require a great deal of time and effort in order to secure the occupant within the system. There is currently no device which can simply and readily be used in tandem with existing seat belt systems in order to comfortably accommodate occupants of all genders and sizes.

SUMMARY OF THE INVENTION

It is thus the object of the present invention to overcome the limitations and disadvantages of prior seat belt systems designed to be used for seated, pregnant and overweight automobile occupants.

It is thus the object of the present invention to provide a seat belt attachment device which can be used with existing seat belt systems.

It is another object of the present invention to provide a seat belt attachment device which is simple and easy to install in existing seat belt systems.

It is a further object of the present invention to provide a seat belt attachment device which is effective in allowing the occupant to configure the seat belt strap, so as to ensure for the comfort of the occupant being secured within the seat belt system.

These and other objectives are accomplished by the present invention, a seat belt attachment device which comprises an integral body having a buckle component which has a tongue fastening mechanism configured to connect with the seat belt tongue of an existing seat belt system. An attachment tongue extends from the buckle component and is designed to connect with the seat belt connector of the existing seat belt system. At least one rigid bar extends outwardly from the buckle component such that when the seat belt buckle connector and the seat belt tongue are connected to the tongue fastening mechanism and the attachment tongue, the attachment device is located between the seat belt buckle connector and the seat belt tongue and the seat belt strap can be custom wrapped around the rigid bar in order to configure the strap comfortably away from and around the body of the occupant.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
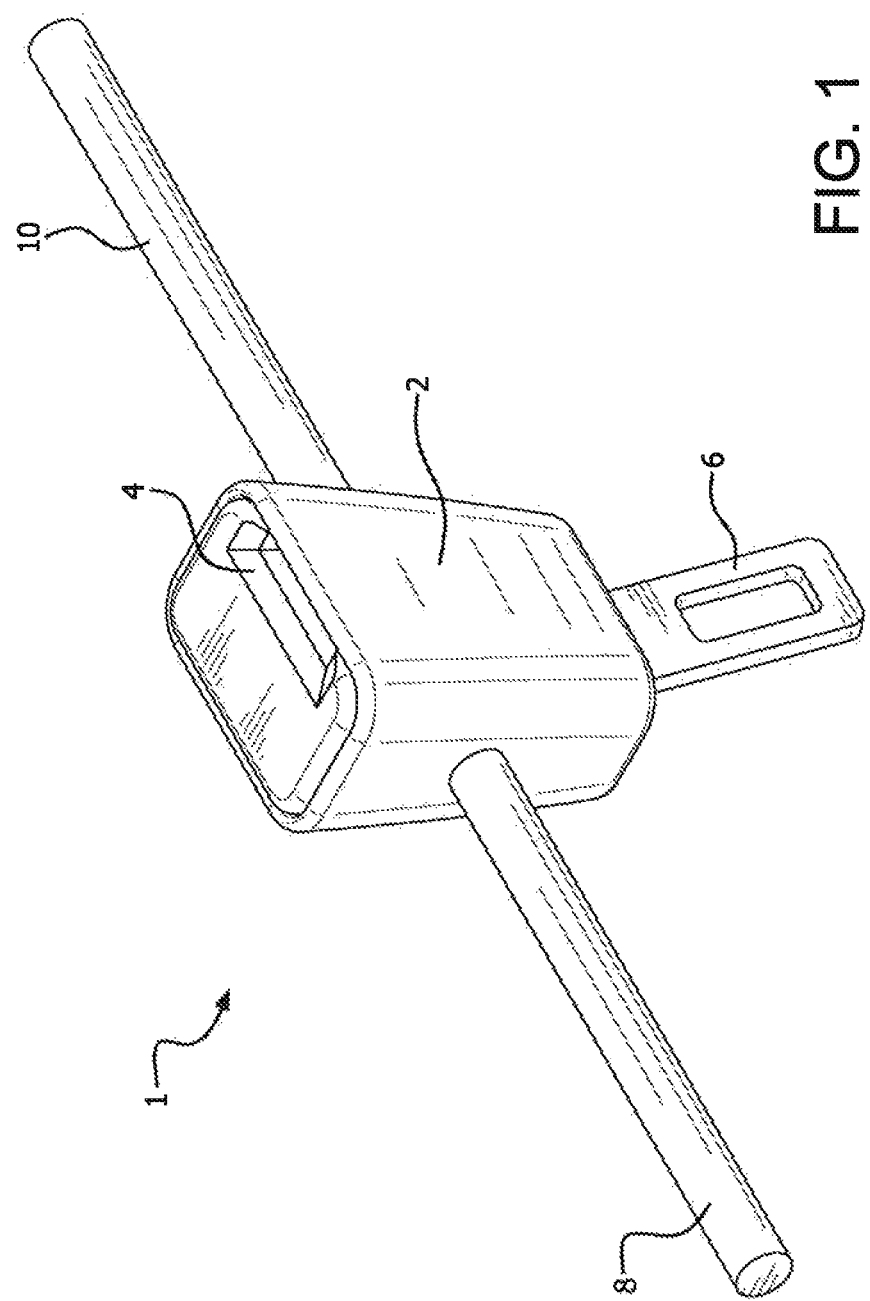
FIG. 1 is a front perspective view of the attachment device of the present invention.
Figure 2:
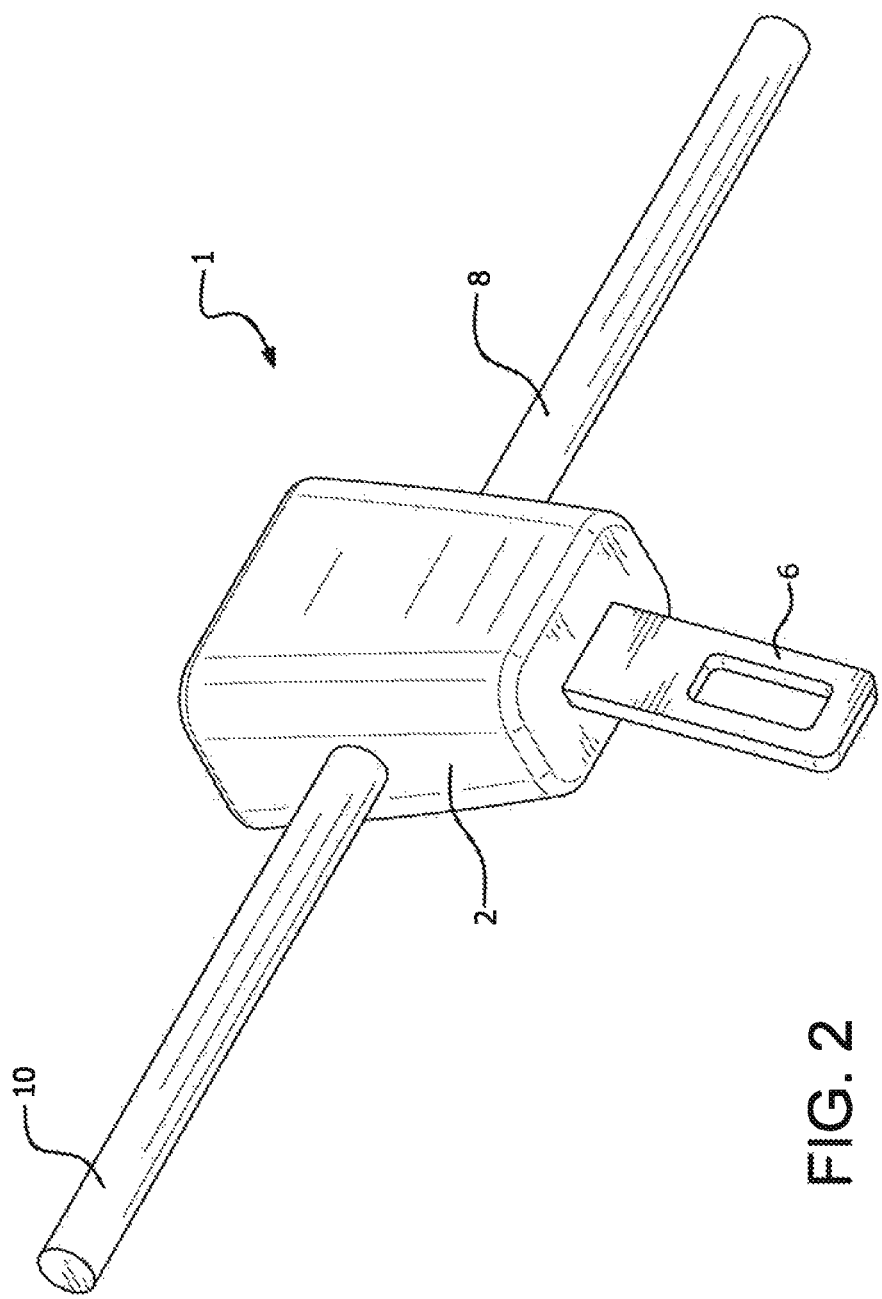
FIG. 2 is a rear perspective view of the attachment device of the present invention.

Attachment device 1 for a seat belt system is an integral body comprising buckle component 2 having a first connection means in the form of tongue fastening mechanism 4, and a second connection means in the form of attachment tongue 6 extending from the buckle component. Tongue fastening mechanism 4 is located at the front end of buckle component 2 and attachment tongue 6, located on the rear end of the buckle component, extends outwardly and downwardly. Tongue fastening mechanism 4 comprises a spring loaded device presently in use and common to current seat belt buckle connectors. It is configured to accept the seat belt tongue found in vehicle seat belt systems. By the same token, attachment tongue 6 is configured to be secured within seat belt buckle connectors commonly utilized in seat belt systems.

Rigid bars 8 and 10 extend outwardly from either side of buckle component 2. While dual bars are shown, it is contemplated that only one rigid bar extending from buckle component can be used.

Figure 3:
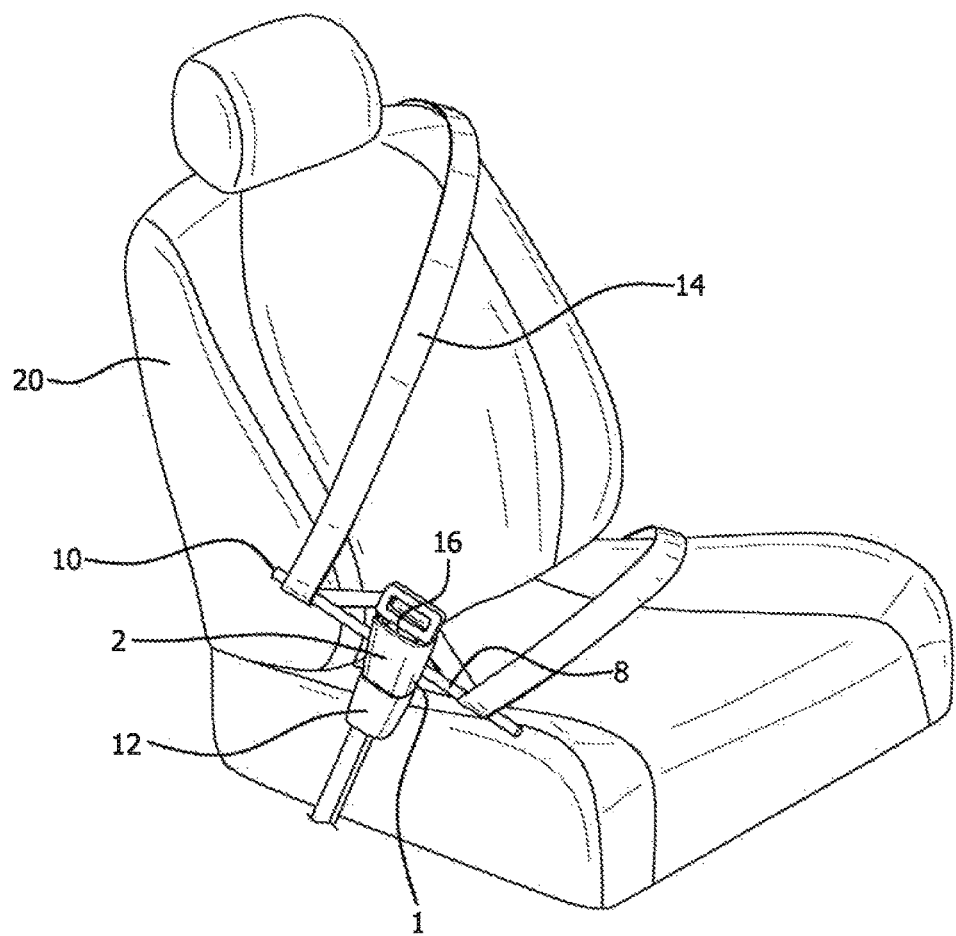
FIG. 3 is a view of the present invention in use with an existing seat belt system.

With specific reference to FIG. 3, attachment device is used with seat 20 having an existing seat belt system comprising seat belt buckle connector 12, strap 14, and seat belt tongue 16.

Seat belt tongue 16 of the seat belt system is inserted and secured within tongue fastening mechanism 4 of buckle component 2. Tongue 6 of the attachment device is then inserted into and secured within seat belt buckle connector 12 of the seat belt system. In this manner, attachment device 1 is located and secured between seat belt buckle connector 12 and seat belt tongue 16, with rigid bars 8 and 10 extending outwardly from buckle component 2.

Once attachment device 1 is secured as described above, strap 14 can be wrapped around bars 8 and 10 in a multitude of configurations, at the pleasure of the occupant of seat 20 as seen, for example, in FIG. 3. This will allow the strap to be positioned away from the body of the occupant, providing a measure of comfort, while still maintaining safe restraint.

The use of attachment device 1 will allow strap 14 of the seat belt system to be positioned comfortably away from and around the user, whether that individual be pregnant, overweight or have some other reason to custom position the strap away from the body.

Attachment device 1 is easily detached from the seat belt system by releasing seat belt tongue 16 from tongue fastening system 4 of buckle component 2 and releasing attachment tongue 6 from seat belt buckle connector 12. Upon removal of attachment device 1, the seat belt system can again be utilized in its normal configuration.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An attachment device for a seat belt system having a seat belt buckle connector and a strap with a seat belt tongue, said attachment device comprising:
    an integral body comprising:
        a buckle component comprising first connection means for receiving and securing the seat belt tongue within the buckle component, and second connection means for insertion into the seat belt buckle connector to secure the second connection means within the seat belt buckle connector and;
        two rigid bars extending outwardly from the buckle component, each bar respectively extending from each side of the buckle component, whereby when the seat belt tongue is secured within the buckle component and the second connection means is secured within the seat belt buckle connector, the strap can be wrapped around the bars.

2. The attachment device as in claim 1 wherein the first connection means is a tongue fastening mechanism.

3. The attachment device as in claim 1 wherein the second connection means is a tongue extending from the buckle component.

4. The attachment device as in claim 2 wherein the second connection means is a tongue extending from the buckle component.

5. The attachment device as in claim 1 wherein when the seat belt tongue is secured within the buckle component and the second connection means is secured within the seat belt buckle connector, the attachment device is located between said buckle connector and said tongue.

6. An attachment device for connecting a seat belt buckle connector and a strap with a seat belt tongue, said attachment device comprising:
    an integral body having a buckle component comprising a tongue fastening mechanism configured to connect with the seat belt tongue, an attachment tongue extending from the buckle component configured to connect with the seat belt connector, and two rigid bars extending outwardly from the buckle component, each bar respectively extending from each side of the buckle component whereby when the seat belt buckle connector and the seat belt tongue are connected to the tongue fastening mechanism and the attachment tongue, the attachment device is located between said seat belt buckle connector and said seat belt tongue.

* * * * *